United States Patent
Nakayama

(10) Patent No.: US 8,526,999 B2
(45) Date of Patent: Sep. 3, 2013

(54) SIGNAL CONVERTER, WIRELESS SIGNAL TRANSMISSION SYSTEM, AND WIRELESS SIGNAL RECEPTION SYSTEM

(75) Inventor: Eiji Nakayama, Osaka (JP)

(73) Assignee: KYOCERA Corporation, Kyoto (JP)

( * ) Notice: Subject to any disclaimer, the term of this patent is extended or adjusted under 35 U.S.C. 154(b) by 168 days.

(21) Appl. No.: 13/001,276

(22) PCT Filed: Jun. 12, 2009

(86) PCT No.: PCT/JP2009/002669
§ 371 (c)(1),
(2), (4) Date: Dec. 27, 2010

(87) PCT Pub. No.: WO2009/157146
PCT Pub. Date: Dec. 30, 2009

(65) Prior Publication Data
US 2011/0096869 A1     Apr. 28, 2011

(30) Foreign Application Priority Data

Jun. 26, 2008   (JP) .................................. 2008-167851

(51) Int. Cl.
*H04B 1/02*   (2006.01)
*H04B 7/02*   (2006.01)
*H04M 1/00*   (2006.01)

(52) U.S. Cl.
USPC ..................... 455/550.1; 455/101; 455/552.1; 455/562.1; 375/267; 375/295; 375/299

(58) Field of Classification Search
USPC ................ 455/552.1–553.1, 561–562.1, 101, 455/103, 132, 550.1; 375/229–233, 267, 375/299, 346–350, 295
See application file for complete search history.

(56) References Cited

U.S. PATENT DOCUMENTS

| | | | | |
|---|---|---|---|---|
| 5,561,667 A | * | 10/1996 | Gerlach | ........................ 370/286 |
| 6,539,209 B1 | | 3/2003 | Dajer et al. | |
| 7,212,569 B1 | | 5/2007 | Clark | |
| 7,418,035 B1 | * | 8/2008 | Clark | ........................... 375/233 |

(Continued)

FOREIGN PATENT DOCUMENTS

| CN | 1985372 A | 6/2007 |
|---|---|---|
| CN | 101150557 A | 3/2008 |

(Continued)

OTHER PUBLICATIONS

International Search Report dated Jul. 28, 2009 issued by the Japanese Patent Office for International Application No. PCT/JP2009/002669.

(Continued)

*Primary Examiner* — Simon Nguyen
(74) *Attorney, Agent, or Firm* — Procopio, Cory, Hargreaves & Savitch LLP

(57) ABSTRACT

A signal converter 100 provided on an optical cable connecting the baseband unit 300 and the radio units 420 and 430. The signal converter 100 has a function to return time domain signals output from the baseband unit 300, to frequency domain signals and generate as many time domain signals as the number of antennas by assigning weights onto the frequency domain signals, and a function to combine, by an array combining, a plurality of time domain signals to a single frequency domain signal, and output the single frequency domain signal to the baseband unit 300.

6 Claims, 4 Drawing Sheets

(56) References Cited

U.S. PATENT DOCUMENTS

| | | |
|---|---|---|
| 7,746,943 B2 | 6/2010 | Yamaura |
| 7,787,564 B1* | 8/2010 | Anvari .......................... 375/297 |
| 2003/0147655 A1* | 8/2003 | Shattil ........................... 398/182 |
| 2005/0215202 A1* | 9/2005 | Sugar et al. ...................... 455/69 |
| 2006/0181456 A1* | 8/2006 | Dai ................................ 342/377 |
| 2006/0245477 A1* | 11/2006 | Yoshida ......................... 375/148 |
| 2007/0230328 A1 | 10/2007 | Saitou |
| 2007/0230383 A1* | 10/2007 | Yune et al. ..................... 370/310 |
| 2007/0258541 A1 | 11/2007 | Yamaura |
| 2008/0045143 A1 | 2/2008 | Yoshida et al. |
| 2008/0075148 A1 | 3/2008 | Li et al. |
| 2008/0075158 A1 | 3/2008 | Li |
| 2008/0075179 A1 | 3/2008 | Li |
| 2008/0075180 A1* | 3/2008 | Li et al. ......................... 375/260 |
| 2008/0075189 A1 | 3/2008 | Li et al. |
| 2008/0075208 A1 | 3/2008 | Li et al. |
| 2008/0075209 A1 | 3/2008 | Li et al. |
| 2008/0075216 A1 | 3/2008 | Li et al. |
| 2008/0095141 A1 | 4/2008 | Kong et al. |
| 2010/0094637 A1* | 4/2010 | Vinton ........................... 704/500 |
| 2010/0135377 A1 | 6/2010 | Li et al. |
| 2012/0093247 A1 | 4/2012 | Miyoshi et al. |

FOREIGN PATENT DOCUMENTS

| | | |
|---|---|---|
| EP | 1 841 159 A2 | 10/2007 |
| EP | 1 898 542 A1 | 3/2008 |
| EP | 1 903 731 A2 | 3/2008 |
| EP | 1 160 997 B1 | 4/2009 |
| JP | 2002-026781 A | 1/2002 |
| JP | 2005-304039 A | 10/2005 |
| JP | 2006-050317 A | 2/2006 |
| JP | 2006-340265 A | 12/2006 |
| JP | 2007-089113 A | 4/2007 |
| JP | 2007-274048 A | 10/2007 |
| JP | 2007-318730 A | 12/2007 |
| JP | 2008-048236 A | 2/2008 |
| JP | 2008-066982 A | 3/2008 |

OTHER PUBLICATIONS

Notification of Reasons for Refusal dated Jun. 15, 2010 issued by the Japanese Patent Office for the corresponding Japanese Application No. JP 2008-167851.

First Office Action dated Feb. 20, 2013, issued in counterpart Chinese Application No. 2009-80124227.4.

* cited by examiner

SIGNAL CONVERTER, WIRELESS SIGNAL TRANSMISSION SYSTEM, AND WIRELESS SIGNAL RECEPTION SYSTEM

TECHNICAL FIELD

The present invention relates to a wireless signal transmission/reception system and a signal converter used in the system, and in particular to a wireless signal transmission/reception system with the adaptive array technology used in the main part thereof, and a signal converter used in the system.

BACKGROUND ART

It is known that, in order to cause a wireless base station not supporting the adaptive array to support the adaptive array, a replacement of the baseband unit is required. FIG. 3 shows a structure of a conventional wireless base station that does not support the adaptive array. FIG. 4 shows a structure of a conventional wireless base station that supports the adaptive array.

As shown in FIG. 3, a baseband unit 300, which performs an omnidirectional communication, includes a MAC processing unit 301, a signal modulation unit 302, an inverse FFT (Fast Fourier Transfer) unit 303, a CP (Cyclic Prefix) attaching unit 304, a signal demodulation unit 305, a FFT (Fast Fourier Transfer) unit 306, and a CP removing unit 307. The signal modulation unit 302, inverse FFT unit 303, and CP attaching unit 304 are functional units that function only when a signal is transmitted, and the signal demodulation unit 305, FFT unit 306, and CP removing unit 307 are functional units that function only when a signal is received. When the wireless base station shown in FIG. 3 is caused to support the adaptive array, it is necessary to replace the baseband unit 300.

FIG. 4 is a functional structure diagram of the wireless base station in which the baseband unit 300 has been replaced with the baseband unit 400, includes as many radio units as the number of antennas, and supports the adaptive array. The baseband unit 400 includes a MAC processing unit 401, a signal modulation unit 402, inverse FFT units 404 and 406, CP attaching units 405 and 407, a signal demodulation unit 412, FFT units 414 and 416, and CP removing units 415 and 417.

As understood by comparing FIG. 3 with FIG. 4, in order to support the adaptive array, as many inverse FFT units, CP attaching units, FFT units, and CP removing units as the number of antennas are required.

Patent Literature 1 discloses a wireless base station that can switch between the adaptive array and the omnidirectional communication.

CITATION LIST

Patent Literature

Patent Literature 1
Japanese Patent Application Publication No. 2008-48236

SUMMARY OF INVENTION

Technical Problem

Meanwhile, the replacement of the baseband unit is not welcome since it takes much loading cost. More specifically, the functional units such as the MAC processing unit, signal modulation unit, and signal demodulation unit in the baseband unit require a high-performance CPU to perform signal processing. Creating a baseband unit newly for this purpose takes much cost. Signals output from the signal modulation unit of the original baseband unit may be extracted for use of this purpose. However, this approach may not be available depending on the baseband unit (for example, if the baseband unit has been made by a different maker).

It is therefore an object of the present invention to provide a signal converter which enables a wireless base station not supporting the adaptive array to support the adaptive array without replacement of the baseband unit and without modification of the original baseband unit, and to provide a transmission/reception system including the signal converter.

Solution to Problem

In one aspect of the present invention, the above problems are solved by a signal converter connected with a plurality of radio units, the signal converter comprising: a first interface unit operable to receive input of a single time domain signal to be used for a wireless transmission; a first converting unit operable to transform the time domain signal received by the first interface unit to a frequency domain signal which is a signal constituted from frequency components; a generating unit operable to generate a plurality of different frequency domain signals by performing a weighting calculation onto the frequency domain signal; a second converting unit operable to transform the plurality of frequency domain signals generated by the generating unit to a plurality of time domain signals and output the time domain signals; and a second interface unit operable to output the plurality of time domain signals output from the second converting unit, one-to-one to different radio units.

Advantageous Effects of Invention

With the above-described structure, the signal converter transforms a single time domain signal to be used for a wireless transmission to a frequency domain signal and generates as many time domain signals as the number of radio units by assigning weights onto the frequency domain signal. Thus when the signal converter is connected to be able to receive an output of the baseband unit, the wireless base station can execute the adaptive array transmission. Furthermore, in this case, there is no need to replace or modify the baseband unit. Thus the above-described problems are all solved.

Also, in another aspect of the present invention, there is provided a signal converter comprising: a second interface unit operable to receive input of a plurality of time domain signals; a first converting unit operable to transform the plurality of time domain signals received by the second interface unit to a plurality of frequency domain signals which are signals constituted from frequency components; a combining unit operable to generate a single frequency domain signal by combining the plurality of transformed frequency domain signals; a second converting unit operable to transform the single frequency domain signal generated by the combining unit to a single time domain signal; and a first interface unit operable to output the single time domain signal.

With the above-described structure, even when a plurality of radio units receive time domain signals, it is possible to generate a single time domain signal by performing the array combining and output the single time domain signal to the original baseband unit. Thus, without replacement of the baseband unit, the adaptive array reception can be executed only with installation of the signal converter on a line connecting the baseband unit and the radio units.

DESCRIPTION OF EMBODIMENTS

The following describes a signal converter in one embodiment of the present invention with reference to the attached drawings.

Embodiment

Structure

Figure 1:
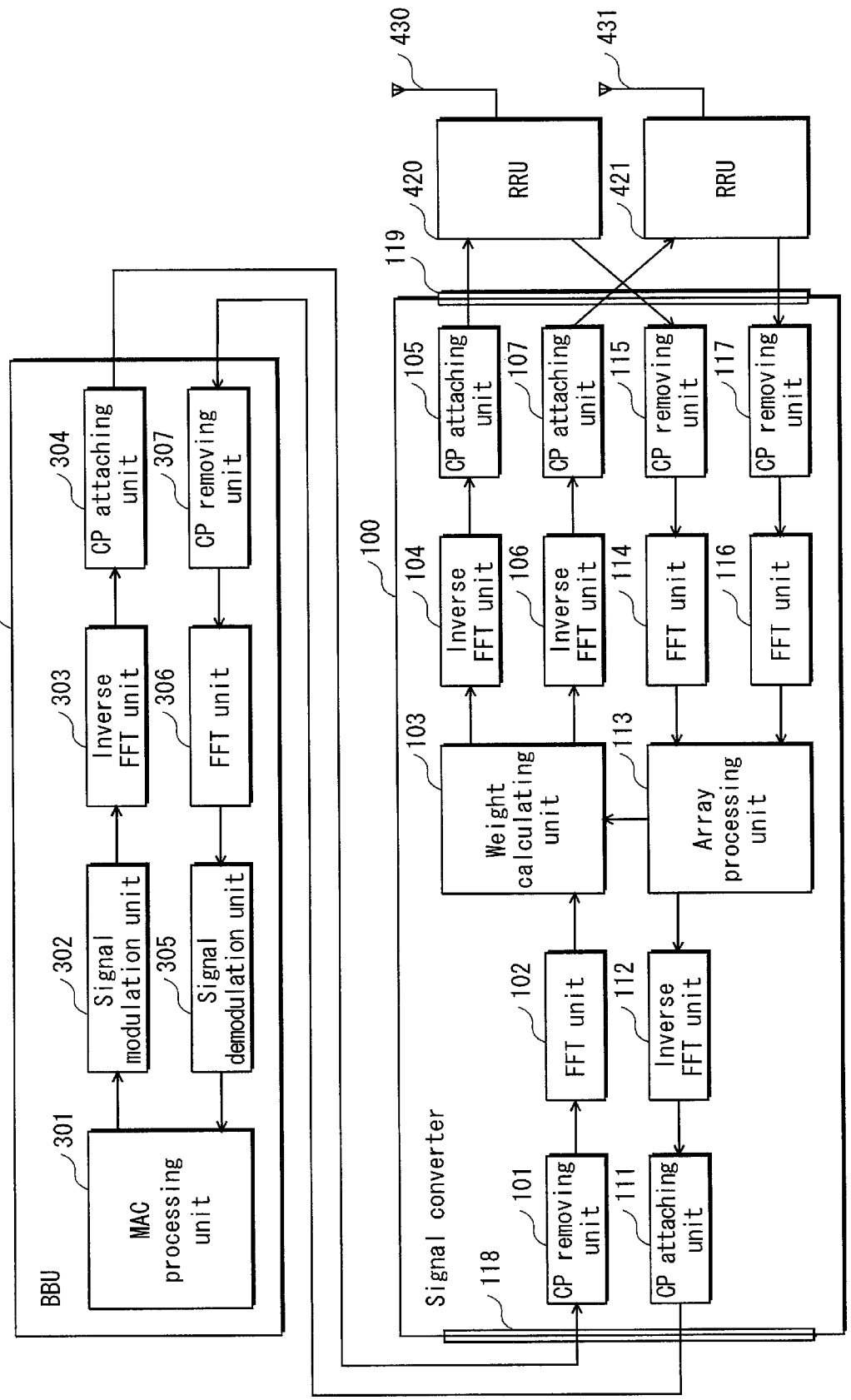
FIG. 1 is a functional block diagram showing the system structure of the wireless base station in the embodiment.

FIG. 1 is a structure diagram showing the system structure of the wireless base station.

The wireless base station includes a BBU (Base Band Unit) 300, a signal converter 100, a RRU (Remote Radio Unit) 420, and a RRU 421.

The baseband unit 300 and the radio unit 420 are the same as those that had originally been loaded in the wireless base station in the state not supporting the adaptive array, and the present invention is characterized by the signal converter 100 which is additionally provided on the communication path connecting the baseband unit 300 and the radio unit 420.

<Baseband Unit 300>

The baseband unit 300 includes a MAC processing unit 301, a signal modulation unit 302, an inverse FFT unit 303, a CP attaching unit 304, a signal demodulation unit 305, a FFT unit 306, and a CP removing unit 307.

The MAC processing unit 301 has a function to transform the data constituting a signal to be transmitted (substantial data or the like) to a packet signal, and output the packet signal to the signal modulation unit 302, and a function to analyze a demodulation signal input from the signal demodulation unit 305 and output the signal after the analysis to an upper layer (not illustrated).

<Transmission Side>

The signal modulation unit 302 has a function to modulate a signal input from the MAC processing unit 301 and output a frequency domain signal to the inverse FFT unit 303.

The inverse FFT unit 303 has a function to transform the frequency domain signal input from the signal modulation unit 302 to a time domain signal by performing the inverse FFT onto the frequency domain signal, and output the time domain signal to the CP attaching unit 304.

The CP attaching unit 304 has a function to attach a CP to the time domain signal input from the inverse FFT unit 303 and output the resultant signal to outside the baseband unit 300. The CP (Cyclic Prefix) is used for the reception side to recognize the start and end of the substantial data contained in the time domain signal transmitted thereto, and attaching the CP means copying a predetermined number of bits from the end of the time domain signal to the start thereof. The CP may be called a guard interval as well.

<Reception Side>

The CP removing unit 307 has a function to remove the CP from the time domain signal input from outside of the baseband unit 300, and output the time domain signal, from which the CP has been removed, to the FFT unit 306.

The FFT unit 306 transforms the time domain signal input from the CP removing unit 307, from which the CP has been removed, to a frequency domain signal by performing the FFT onto the time domain signal, and outputs the frequency domain signal to the signal demodulation unit 305.

The signal demodulation unit 305 has a function to obtain a demodulated signal by demodulating the frequency domain signal input from the FFT unit 306, and output the demodulated signal to the MAC processing unit 301.

<Signal Converter 100>

The signal converter 100 includes a CP removing unit 101, a FFT unit 102, a weight calculating unit 103, an inverse FFT unit 104, a CP attaching unit 105, an inverse FFT unit 106, a CP attaching unit 107, a CP attaching unit 111, an inverse FFT unit 112, an array processing unit 113, a FFT unit 114, a CP removing unit 115, a FFT unit 116, and a CP removing unit 117.

In the signal converter 100, the time domain signal output from the baseband unit 300 is received by a first interface unit 118, and then input into the CP removing unit 101. Also, a time domain signal to which a CP has been attached by the CP attaching unit 111 is output from the first interface unit 118 to the baseband unit 300. The first interface unit 118 is provided with two ports one of which is used for transmitting time domain signals on which the adaptive array process has not been performed, and the other is used for receiving such time domain signals.

Also, in the signal converter 100, time domain signals output from the radio units 420 and 421 are received by a second interface unit 119, and then input into the CP removing units 115 and 117, respectively. Also, time domain signals to which CPs have been attached by the CP attaching units 105 and 107 are output from the second interface unit 119 to the radio units 420 and 421, respectively. The second interface unit 119 is provided with two ports one of which is used for transmitting time domain signals on which the adaptive array process has not been performed, and the other is used for receiving such time domain signals.

The first interface unit 118 and the second interface unit 119 are ports conforming to the standard of the communication path to which the baseband unit 300 and radio units had originally been connected. For example, when the baseband unit 300 and radio units had been connected by an optical fiber cable conforming to the standard of OBSAI (Open Basestation Standard Initiative), the first interface unit 118 and the second interface unit 119 are ports conforming to the standard of OBSAI; and when the baseband unit 300 and radio units had been connected by an optical fiber cable conforming to the standard of CPRI (Common Public Radio Interface), the first interface unit 118 and the second interface unit 119 are ports conforming to the standard of CPRI.

<Transmission Side>

The CP removing unit 101 has a function to remove the CP from the time domain signal input from the baseband unit 300 via the first interface unit 118, and output the time domain signal, from which the CP has been removed, to the FFT unit 102.

The FFT unit 102 transforms the time domain signal input from the CP removing unit 101, from which the CP has been removed, to a frequency domain signal by performing the FFT onto the time domain signal, and outputs the frequency domain signal to the signal demodulation unit 103.

The weight calculating unit 103 has a function to perform a weighting calculation by multiplying the weight signal calculated by the array processing unit 113, and output as many frequency domain signals as the number of antennas. Note that the weighting calculation is already known, and detailed description thereof is omitted here. The weight calculating unit 103 outputs the frequency domain signal for the radio unit 420 to the inverse FFT unit 104, and outputs the frequency domain signal for the radio unit 421 to the inverse FFT unit 106.

The inverse FFT unit 104 has a function to transform the frequency domain signal input from the signal modulation unit 103 to a time domain signal by performing the inverse FFT onto the frequency domain signal, and output the time domain signal to the CP attaching unit 105.

The CP attaching unit 105 has a function to attach a CP to the time domain signal input from the inverse FFT unit 104 and output the resultant signal to the radio unit 420 via the second interface unit 119.

The inverse FFT unit 106 has a function to transform the frequency domain signal input from the signal modulation unit 103 to a time domain signal by performing the inverse FFT onto the frequency domain signal, and output the time domain signal to the CP attaching unit 107.

The CP attaching unit 107 has a function to attach a CP to the time domain signal input from the inverse FFT unit 104 and output the resultant signal to the radio unit 421 via the second interface unit 119.

<Reception Side>

The CP removing unit 117 has a function to remove the CP from the time domain signal input from the radio unit 421 via the second interface unit 119, and output the time domain signal, from which the CP has been removed, to the FFT unit 116.

The FFT unit 116 has a function to transform the time domain signal input from the CP removing unit 117, from which the CP has been removed, to a frequency domain signal by performing the FFT onto the time domain signal, and output the frequency domain signal to the array processing unit 113.

The CP removing unit 115 has a function to remove the CP from the time domain signal input from the radio unit 420 via the second interface unit 119, and output the time domain signal, from which the CP has been removed, to the FFT unit 114.

The FFT unit 114 has a function to transform the time domain signal input from the CP removing unit 115, from which the CP has been removed, to a frequency domain signal by performing the FFT onto the time domain signal, and output the frequency domain signal to the array processing unit 113.

The array processing unit 113 has a function to return a plurality of frequency domain signals input from the FFT units 114 and 116 by performing an array combining process onto the frequency domain signals and output a single frequency domain signal to the inverse FFT unit 112. Also, the array processing unit 113 has a function to notify the weight calculating unit 103 of a weight signal that is to be multiplied during the outputting performed by the weight calculating unit 103. Note that the array combining process is already known, thus detailed description thereof is omitted here.

The inverse FFT unit 112 has a function to transform the frequency domain signal input from the array processing unit 113 to a time domain signal by performing the inverse FFT onto the frequency domain signal, and output the time domain signal to the CP attaching unit 111.

The CP attaching unit 111 has a function to attach a CP to the time domain signal input from the inverse FFT unit 112 and output the resultant signal to the baseband unit 300 via the first interface unit 118.

<Radio Unit 420>

The radio unit 420 has a function to convert the time domain signal, which is input from the signal converter 100 and to which a CP has been attached by the CP attaching unit 105, to an analog signal and transmit the analog signal via the antenna 430 wirelessly. Also, the radio unit 420 has a function to transform the time domain signal, which is received wirelessly via the antenna 430, to a digital signal and output the digital signal to the signal converter 100.

<Radio Unit 421>

The radio unit 421 has a function to convert the time domain signal, which is input from the signal converter 100 and to which a CP has been attached by the CP attaching unit 107, to an analog signal and transmit the analog signal via the antenna 431 wirelessly. Also, the radio unit 421 has a function to transform the time domain signal, which is received wirelessly via the antenna 431, to a digital signal and output the digital signal to the signal converter 100.

Note that it is necessary to add radio units and antennas as needed to the base station, in addition to those that had been provided originally in the base station.

<Use Form>

Figure 2:
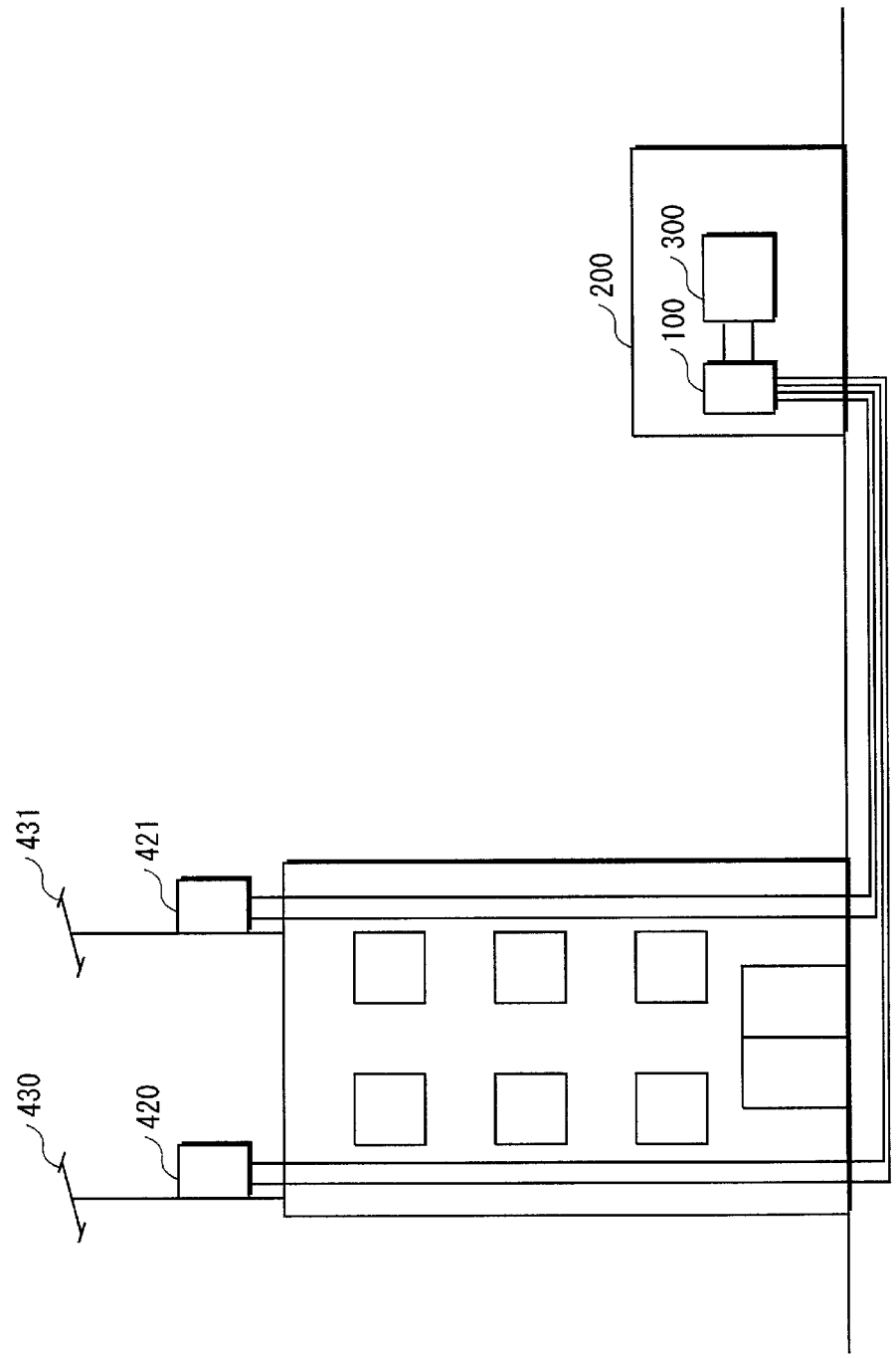
FIG. 2 shows a use form of the signal converter of the embodiment.
Figure 3:
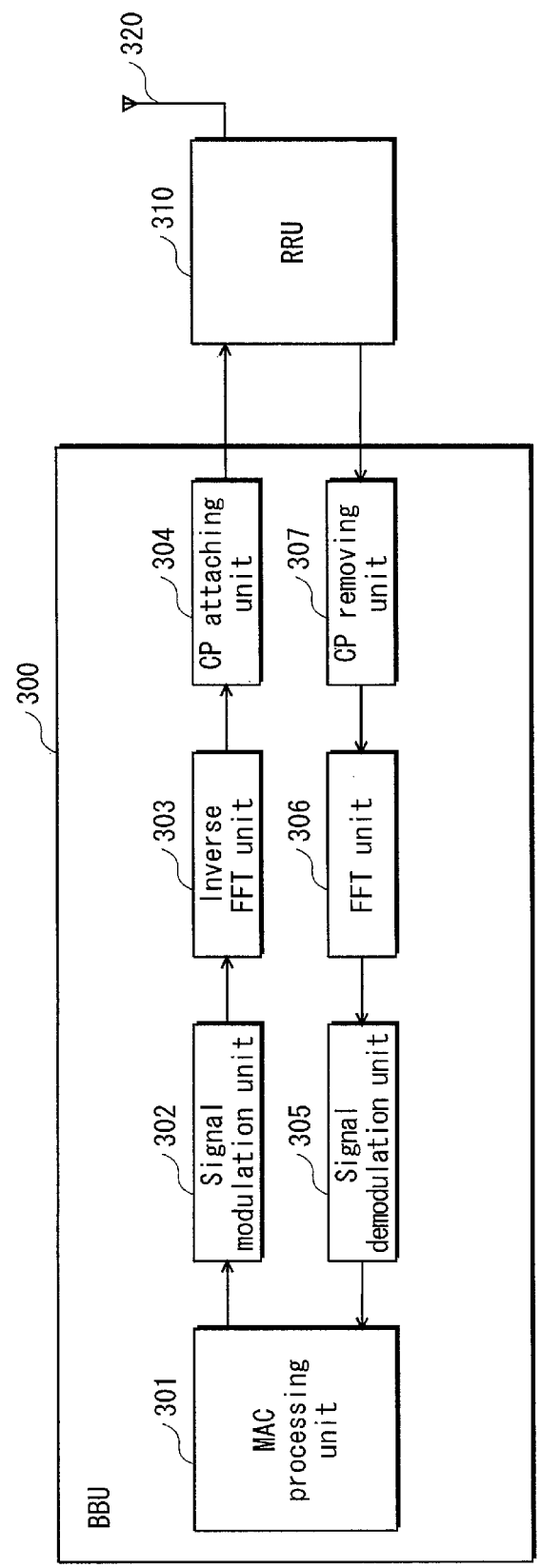
FIG. 3 is a functional block diagram showing the functional structure of a conventional wireless base station not supporting the adaptive array.
Figure 4:
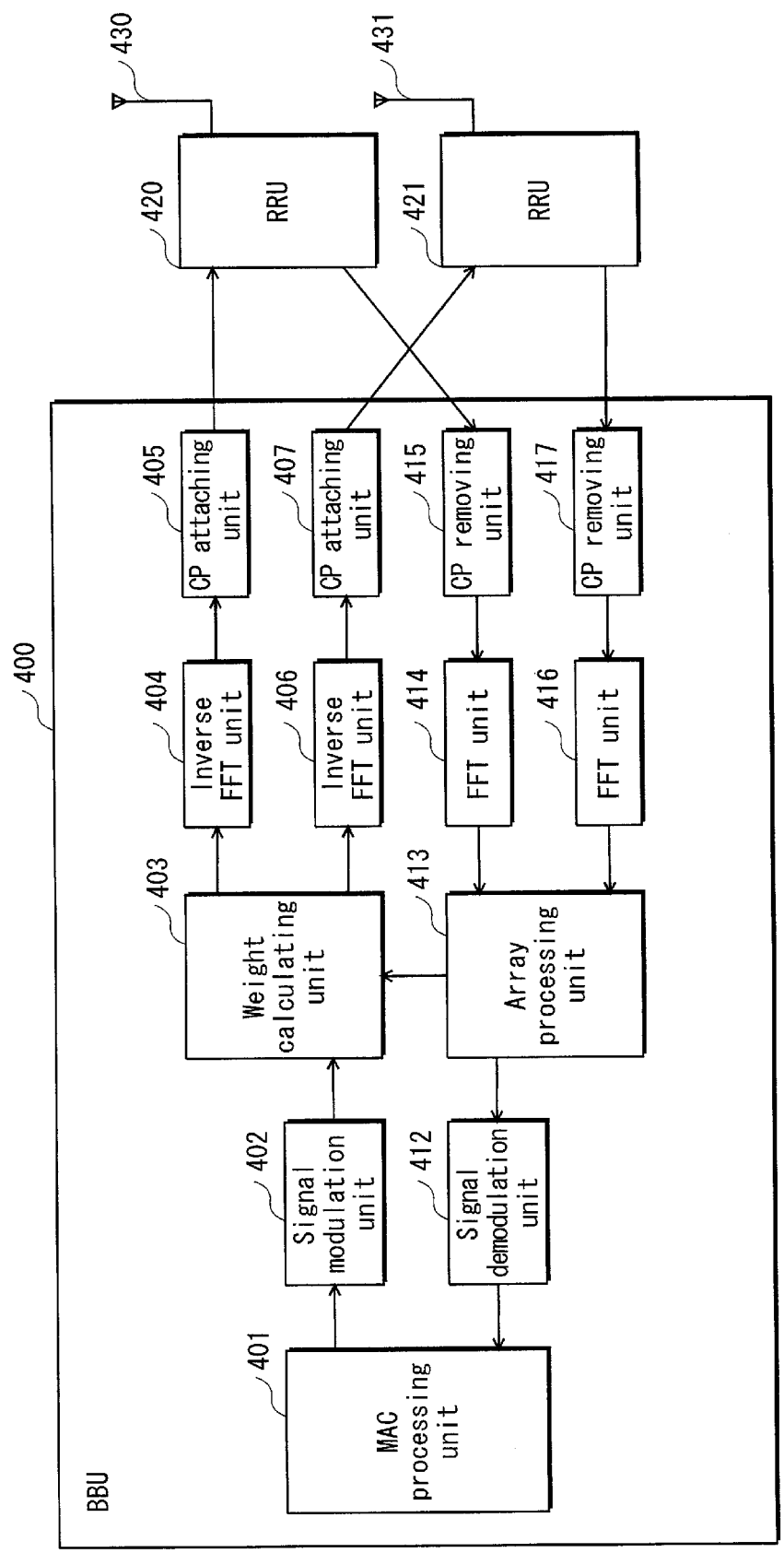
FIG. 4 is a functional block diagram showing the functional structure of a conventional wireless base station supporting the adaptive array.

FIG. 2 shows an actual use form of the wireless base station described above, namely an arrangement example of the constituent elements.

The antennas 430 and 431 are, for example, installed in the rooftop of the building, and the radio units 420 and 421 are installed together with the antennas, respectively. From the radio unit 420, two optical fiber cables for transmission and reception are extended to the signal converter 100 in an operator room 200. From the radio unit 421, two optical fiber cables for transmission and reception are extended to the signal converter 100 in the operator room 200. The signal converter 100 is connected with the baseband unit 300 by the two optical fiber cables.

Note that the operator room 200 may be present in the building in which the radio units 420 and 421 are placed.

As described so far, according to the embodiment of the present invention, it is possible to cause a wireless base station not supporting the adaptive array to support the adaptive array, only by additionally providing a signal converter between the baseband unit and the radio units connected by optical fiber cables and preparing antennas and radio units as needed.

In the baseband unit, preparing the functional units: the MAC processing unit; signal modulation unit; and signal demodulation unit take more cost than preparing the functional units: the CP removing unit 101; FFT unit 102; CP attaching unit 111; and inverse FFT unit 112.

The signal converter is not provided with the MAC processing unit, signal modulation unit, or signal demodulation unit. Accordingly, it requires less cost for the present invention to cause a wireless base station not supporting the adaptive array to support the adaptive array, than realizing it by replacing the baseband unit.

<Supplementary Notes>

In the above embodiment, a method for implementing the present invention has been described. However, embodiments of the present invention is not limited to this. The following describes various modifications other than the above embodiment that are included in the concept of the present invention.

(1) In the above embodiment, two antennas (antennas 430 and 431) are used. However, the number of antennas is not limited to two, but a plurality of, for example, four antennas may be used. In that case, the signal converter needs to be provided with as many inverse FFT units, CP attaching units, FFT units, and CP removing units as the number of antennas, and the weighting calculation and the array combining calculation need to be performed in correspondence with the number of antennas. Also, in that case, the second interface unit 119 needs to be provided with four ports for transmission and four ports for reception.

(2) In the above embodiment, in the state of not supporting the adaptive array, the wireless base station has one antenna, and the baseband unit 300 has a structure of one-input, one-output.

However, when the wireless base station is a WiMAX base station, the base station is provided with two antennas and the baseband unit has a structure of two inputs and two outputs because the WiMAX base station supports MIMO.

Accordingly, in that case, in the signal converter, the first interface unit 118 has a port structure of two inputs and two outputs in correspondence with the number of inputs and outputs of the baseband unit.

(2) In the above embodiment, the time domain signal may only need to contain information of the time domain, and may be a modulation signal containing time domain information.

INDUSTRIAL APPLICABILITY

The signal converter of the present invention is useful as a device that enables a wireless base station not supporting the adaptive array to support the adaptive array without replacement of the baseband unit.

REFERENCE SIGNS LIST

100 signal converter
101, 115, 117, 307 CP removing unit
102, 114, 116, 306 FFT unit
103 weight calculating unit
104, 106, 112, 303 inverse FFT unit
105, 107, 111, 304 CP attaching unit
113 array processing unit
118 first interface unit
119 second interface unit
300 baseband unit (BBU)
301 MAC processing unit
302 signal modulation unit
305 signal demodulation unit
420, 421 radio unit (RRU)
430, 431 antenna

The invention claimed is:

1. A signal converter, connected with a plurality of radio units, for converting a not-weighted signal to a weighted signal, the signal converter comprising:
a first interface unit operable to receive input of a single time domain signal that contains a Cyclic Prefix (CP) and is to be used for a wireless transmission;
a first converting unit operable to remove the CP from the time domain signal received by the first interface unit, and convert the time domain signal, from which the CP has been removed, to a frequency domain signal which is a signal constituted from frequency components;
a generating unit operable to generate a plurality of different frequency domain signals by performing a weighting calculation onto the frequency domain signal;
a second converting unit operable to transform the plurality of frequency domain signals generated by the generating unit to a plurality of time domain signals, attach a CP to each of the time domain signals, and output the time domain signals; and
a second interface unit operable to output the plurality of time domain signals output from the second converting unit, one-to-one to different radio units.

2. The signal converter of claim 1, wherein
the first converting unit includes:
a CP removing unit operable to remove the CP from the time domain signal received by the first interface unit; and
an FFT unit operable to transform the time domain signal, from which the CP has been removed by the CP removing unit, to a frequency domain signal and output the frequency domain signal,
the generating unit includes:
a weight calculating unit operable to calculate weights for a plurality of time domain signals to be generated, generate a plurality of frequency domain signals by multiplying the calculated weights by the frequency domain signal output from the FFT unit, and output the plurality of frequency domain signals,
the second converting unit includes:
a plurality of inverse FFT units each of which is operable to transform a different one of the frequency domain signals output from the weight calculating unit; and
a plurality of CP attaching unit operable to attach a CP to each of the time domain signals output from the plurality of inverse FFT units.

3. A signal converter, connected with a plurality of radio units, for converting a signal on which an array combining process has not been performed, to a signal on which the array combining process has been performed, the signal converter comprising:
a second interface unit operable to receive input of a plurality of time domain signals each of which contains a Cyclic Prefix (CP);
a first converting unit operable to remove the CP from each of the plurality of time domain signals received by the second interface unit, and conver the plurality of time domain signals, from each of which the CP has been removed, to a plurality of frequency domain signals which are signals constituted from frequency components;
a combining unit operable to generate a single frequency domain signal by combining the plurality of transformed frequency domain signals;
a second converting unit operable to transform the single frequency domain signal generated by the combining unit to a single time domain signal, attach a CP to the single time domain signal; and
a first interface unit operable to output the single time domain signal attached with the CP.

4. The signal converter of claim 3, wherein
the first converting unit includes:
a plurality of CP removing units operable to remove the CP from the time domain signal received by the second interface unit; and
a plurality of FFT units operable to transform the time domain signal, from which the CP has been removed by the CP removing unit, to a plurality of frequency domain signals and output the frequency domain signals,
the generating unit includes:
an array processing unit operable to combine, by an array combining, the plurality of frequency domain signals output from the plurality of FFT units into a single frequency domain signal, and output the single frequency domain signal,
the second converting unit includes:
an inverse FFT unit operable to transform the single frequency domain signal output from the array processing unit to a single time domain signal and output the single time domain signal; and
a CP attaching unit operable to attach a CP to the single time domain signal output from the inverse FFT unit.

5. A wireless signal transmission system, comprising:
a baseband unit operable to output a single time domain signal that contains a Cyclic Prefix (CP) and is to be used for a wireless transmission;
a plurality of radio units operable to transmit input time domain signals wirelessly via antennas installed together with the radio units; and
a signal converter provided on a signal path connecting the baseband unit and the radio units,
the baseband unit includes a first output terminal operable to output the single time domain signal,
the signal converter includes:
a first input terminal operable to receive input of a single time domain signal from an input terminal connected by wire with the first output terminal;
a converting unit operable to remove the CP from the time domain signal received by the first input terminal, and convert the time domain signal, from which the CP has been removed, to a frequency domain signal which is a signal constituted from frequency components;
a generating unit operable to generate a plurality of different time domain signals by assigning various weight values to the frequency domain signal;
an attaching unit operable to attach a CP to each of the time domain signals, and output the time domain signals each of which is attached with the CP; and
a plurality of second output terminals operable to output the time domain signals each of which is attached with the CP, wherein
each of the plurality of radio units is provided with a second input terminal which is connected with a different one of the plurality of second output terminals and is operable to receive input of a single time domain signal.

6. A wireless signal reception system, comprising:
a baseband unit operable to execute a predetermined process upon receiving input of a single time domain signal that contains a Cyclic Prefix (CP);
a plurality of radio units operable to receive wirelessly time domain signals via antennas; and
a signal converter provided on a signal path connecting the baseband unit and the plurality of radio units, wherein
each of the plurality of radio units includes:
a first output terminal operable to output the time domain signals that are received wirelessly;
the signal converter includes:
a plurality of first input terminals, connected by wire with the first output terminal, operable to receive input of a single time domain signal from an input terminal connected by wire with the first output terminal;
a first converting unit operable to remove the CP from each of the plurality of time domain signals received by the plurality of first input terminals, and convert the plurality of time domain signals, from each of which the CP has been removed, to a plurality of frequency domain signals which are signals constituted from frequency components;
a combining unit operable to generate a single frequency domain signal by combining the plurality of transformed frequency domain signals;
a second converting unit operable to transform the single frequency domain signal generated by the combining unit to a single time domain signal, attach a CP to the single time domain signal, and output the time domain signal attached with the CP; and
a first output terminal operable to output the single time domain signal output from the second converting unit,
the baseband unit includes:
a second input terminal, connected by wire with the second output terminal, operable to receive input of the single time domain signal.

* * * * *